United States Patent [19]

Erickson

[11] 4,052,180

[45] Oct. 4, 1977

[54] SOFT ICE CREAM MACHINE

[76] Inventor: V. Robert Erickson, 8015 SW. Oleson Road, Portland, Oreg. 97223

[21] Appl. No.: 713,699

[22] Filed: Aug. 12, 1976

Related U.S. Application Data

[63] Continuation-in-part of Ser. No. 587,266, June 16, 1975, abandoned.

[51] Int. Cl.$^2$ .............................................. A23G 9/20
[52] U.S. Cl. ....................................... 62/188; 62/342; 137/578
[58] Field of Search ................. 62/188, 342; 137/578; 222/56; 259/11, 18

[56] References Cited

U.S. PATENT DOCUMENTS

| | | | |
|---|---|---|---|
| 781,093 | 1/1905 | Post .................................. | 137/578 X |
| 1,655,569 | 1/1928 | Scheu .............................. | 137/578 X |
| 2,924,952 | 2/1960 | Swenson et al. ...................... | 62/342 |
| 3,019,615 | 2/1962 | Moser ............................... | 62/342 X |

Primary Examiner—William E. Wayner
Attorney, Agent, or Firm—Eugene M. Eckelman

[57] ABSTRACT

A freezing barrel with mixing and refrigerating apparatus associated therewith has an inlet at one end to receive a prepared mix to be frozen and has a spigot at the other end for dispensing the ice cream. The prepared ice cream mix is supplied from a reservoir having a float controlled uniform rate of flow to the freezing barrel in each operation. The float is supported on a hollow open ended stem slidable in an upright tubular support and an opening is provided in the stem for gravity constant pressure flow of the mix thereinto as ice cream is drawn off through the spigot. Flow through the opening is controlled by a novel valve such that the rate of such flow is equal to or slightly more than the freezing and mixing capacity of the freezing barrel. The upper end of the stem is open to atmosphere through the valve to admit air into the mix.

3 Claims, 5 Drawing Figures

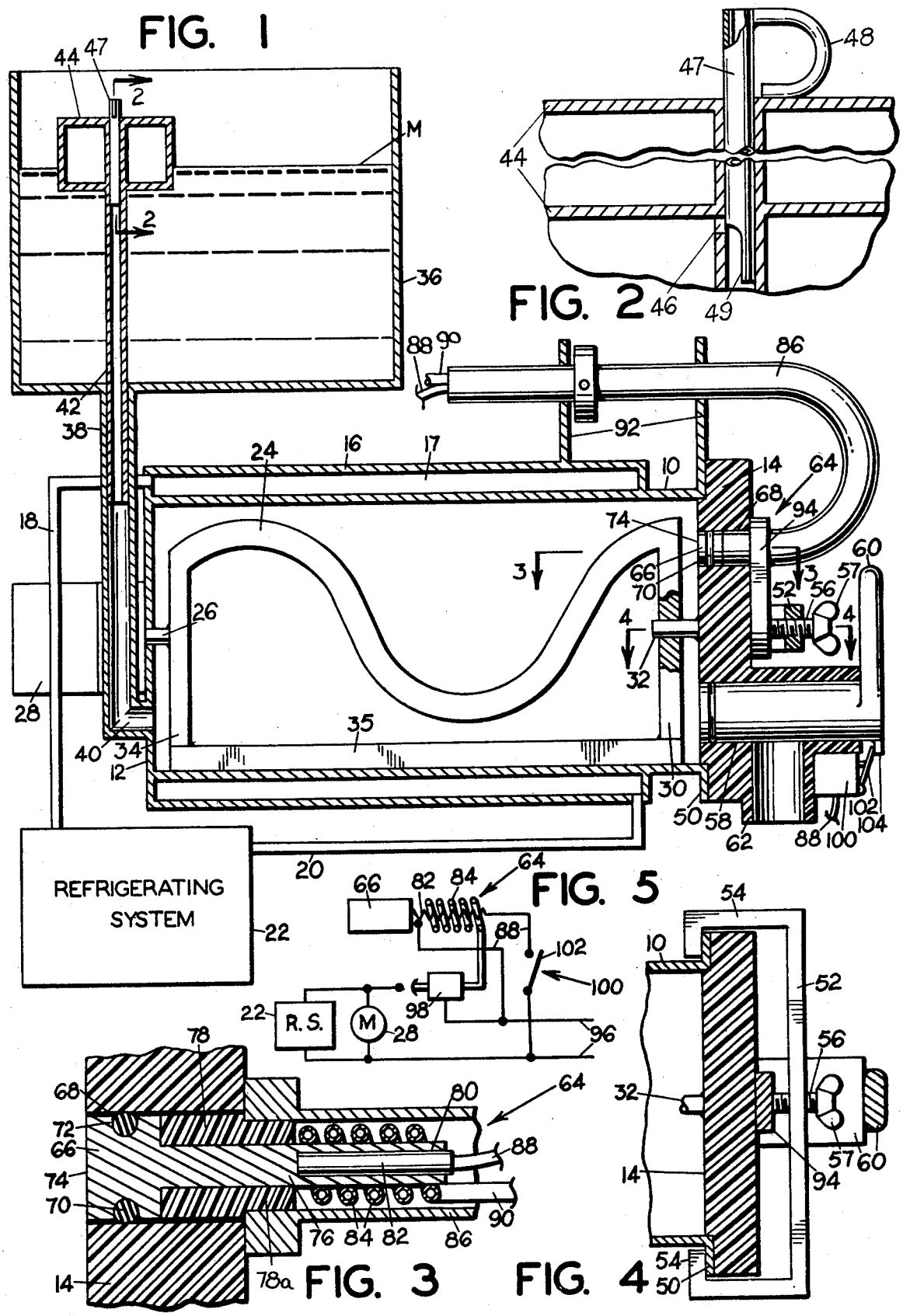

SOFT ICE CREAM MACHINE

REFERENCE TO PRIOR APPLICATIONS

This application is a continuation-in-part of application Ser. No. 587,266, filed June 16, 1975 now abandoned for Soft Ice Cream Machine.

BACKGROUND OF THE INVENTION

This invention relates to new and useful improvements in machines for making soft ice cream.

It is well known in the art of forming soft ice cream in machines designed for such purpose that excess temperature fluctuations in the freezing barrel of the machines result in the formation of an inferior quality of ice cream. For one thing, the ice cream will not have the desired smooth consistency but rather will have a crystalline-type grain which is undesirable. Prior devices have controlled the temperature by sensing means associated with the wall of the freezing barrel and some prior art devices sense the temperature by pulley tension on a drive motor which operates agitating and dispensing means in the freezing barrel. These prior temperature control and sensing means do not maintain the precise accuracy for producing the smooth and uniform consistency of ice cream desired by applicant.

It is also well known in the art of soft ice cream making that the ice cream will not be of the proper consistency if the inlet of the ice cream mix into the freezing barrel is not precisely controlled with relation to the freezing capabilities of the refrigerating means. A too fast rate of inlet of the mix may occur for example from an excessive head pressure in the inlet. Furthermore, the amount of overrun, namely, the volume of air admixed into the ice cream, is important to the consistency of the ice cream and a desired overrun can only is maintained by a substantially uniform temperature being maintained in the freezing barrel and by a uniform inlet of air with the inlet of the ice cream mix.

SUMMARY OF THE INVENTION

According to the present invention and forming a primary objective thereof, an ice cream machine is provided for making soft ice cream which incorporates improved temperature sensing means for the freezing barrel and which also provides a novel uniform rate of inlet for the ice cream mix from one operation to the other, all to the advantage that a smooth consistency ice cream and an evenly maintained overrun therein is accomplished.

A more particular object of the present invention is to provide temperature sensing means for the freezing barrel of a soft ice cream machine which senses directly the temperature of the ice cream itself.

Another object is to provide inlet means from a storage tank in the freezing barrel of a soft ice cream machine which accomplishes a desired rate of flow in all inlet operations.

The invention will be better understood and additional objects and advantages will become apparent from the following description taken in connection with the accompanying drawings which illustrate a preferred form of the device.

BRIEF DESCRIPTION OF THE DRAWINGS

FIG. 1 is a sectional view, somewhat diagrammatic, taken longitudinally and vertically through an ice cream machine incorporating features of the present invention;

FIG. 2 is an enlarged fragmentary sectional view taken on the line 2—2 of FIG. 1 and showing a portion of inlet means for admitting ice cream mix to the freezing barrel;

FIG. 3 is an enlarged fragmentary sectional view taken on the line 3—3 of FIG. 1 and showing electrical temperature sensing means forming a part of the invention;

FIG. 4 is a fragmentary sectional view taken on the line 4—4 of FIG. 1; and

FIG. 5 is a wiring diagram showing electrical operating means for the ice cream machine.

DETAILED DESCRIPTION OF A PREFERRED EMBODIMENT

With particular reference first to FIG. 1, the ice cream machine of the present invention contains a tubular freezing barrel of chamber 10 having a rear wall 12 and a front wall 14. An outer wall 16 surrounds the freezing barrel and forms a cooling chamber 17 associated with an inlet conduit 18 and an outlet conduit 20 of a refrigerating system 22. The refrigerating system 22 is of well known construction and is therefore not detailed.

The freezing barrel 10 has a longitudinally disposed mixing arm 24 of well-known construction secured at one end on a shaft 26 extending through the rear wall 12 of the barrel 10 and comprising the output shaft of a motor and gear reduction mechanism 28. The forward end of the mixing arm 24 has a transverse extension 30 is journaled on a rearwardly extending stub shaft 32 integral with the front wall 14, and secured on the end of this extension and on a transverse extension 34 of the arm 24 at the rearward end of the barrel is a scraper blade 35 the outer edge of which is adapted to scrape frozen ice cream from the inside of the barrel upon rotation of the mixing arm 24. The removal of the frozen ice cream from the inner surface of the barrel and the mixing action by the arm 24 forms the soft ice cream and maintains it in a uniform consistency ready to serve in a well known manner. Scraper blade 35 and mixing arm 24 are of a shape or otherwise arranged in a well known manner such that the ice cream is urged forward for dispensing.

The ice cream is formed from a prepared mix M stored in a reservoir 36 above the barrel 10. This reservoir may comprise a tank mounted on the barrel 10 in any suitable manner such as by a hollow tubular support 38 projecting integrally upwardly along the rear wall of the barrel 10, the bottom of the tubular support 38 communicating with a port 40 opening into the freezing chamber 10 preferably adjacent to the bottom of the latter. The upper end of the tubular support 38 opens into the reservoir 36 from the bottom.

With particular reference to FIGS. 1 and 2, an open ended hollow stem 42 in the reservoir 36 is slidably engaged in the tubular support 38 and carries a float 44 at its upper end. The float 44 moves up and down with the ice cream mix M with the lower end of the stem 42 slidably adjusting in the support 38. Stem 42 has an inlet opening 46 adjacent its upper end for example, just below the bottom of float 44, through which the ice cream mix enters the stem 42 and flows down through the support 38 for feeding to the barrel 10 through port 40.

Inlet opening 46 is of a dimension to allow maximum rate of flow and control of the flow therethrough is accomplished by a valve 47. This valve comprises an open ended tubular member mounted slidably and rotatably in the top end of hollow stem 42 and supported vertically in such stem by a lateral projection 48 secured integrally thereto and seated on the top of the float. The lower end of valve 47 extends to a point below the opening 46 and has a cut-away or notched portion 49 on one side thereof arranged upon selected vertical positioning of the valve to control the rate of flow through the opening. That is, if the valve is positioned vertically such that the upper edge of notch 49 is at the upper portion or above the opening 46, maximum flow through the opening is permitted, but upon adjusting the valve downward, the opening is closed off a selected amount to reduce the rate of flow. Complete closure of the opening can be accomplished by rotating the valve such that its unnotched portion is brought around in front of the opening.

Selected vertical positioning of valve 47 to control the rate of flow through opening 46 by notch 49 is accomplished by making the projection 48 from a bendable wire-like member disconnected at its bottom end. By bending the wire 48 up at its lower portion, for example, the valve is adjusted down to decrease the rate of flow through the opening. On the other hand, by bending the wire down, the valve is raised to increase the rate of flow.

It is desired that the rate of flow through opening 46 be equal to or slightly more than the freezing and mixing capacity of the freezing barrel, and such adjustment is made to conform to different viscosities of the mix and other variables. Since opening 46 is always at the same position with relation to the top surface of the mix and the head pressure in the inlet does not vary, the head pressure does not interfere with the rate of flow of the mix into the freezing barrel.

The front of the freezing barrel 10 has an outwardly extending flange 50, FIGS. 1 and 4, on which the front wall 14 is removably supported in clamped relation by a bracket 52 having hook-shaped arms 54 which engage behind the flange 50. A setscrew 56 with a wing head 57 is threadedly mounted in the bracket 52 and holds the front wall 14 in place on the freezing barrel in association with structure to be hereinafter described.

Front wall 14 has an outlet 58 with a valve 60 therein which controls the flow of ice cream by in and out movement thereof through a downwardly directed spout 62 communicating with the outlet.

Temperature control means, designated generally by the numeral 64 and shown best in FIGS. 1 and 3, are associated with the front wall 14 and are operative to control the on-off functioning of the refrigerating system 22 and the motor mechanism 28 of the shaft 26. Such control means comprises a sensing head 66 disposed in an aperture 68 in an upper portion of the front wall 14 and sealed in said aperture by an O-ring 70 supported in a groove 72 in the head. The head 66 has a rear or inner face surface 74 which is disposed substantially flush with the inner surface of the front wall 14. Head 66 has a reduced portion or stem 76 which projects forwardly of the front wall and has a sleeve 76 thereon of a length to project forwardly a short distance beyond the front surface of the wall 14 but shorter than stem 76.

Fitted in a rearwardly opening aperture 80 in the stem 76 is an electrical heating element 82, and disposed around the stem in the area of the heating element is a capillary tube-type thermostat 84 adapted to operate the refrigerating system 22 as well as the motor 28 upon a warming of the stem 76 by the heating element or by warming temperatures contacting the head 66.

The sensing head 66 and its stem 76 are constructed of a heat conducting material such as copper in order that temperature conditions at the inner end or face portion 76 of the head are transferred to the area of the thermostat 84. The forward portion of head 66 is plated if necessary to prevent reaction thereon from acid in the ice cream.

Sleeve 78 is of sufficient length to have a front projecting portion 78a, and fitted on this projecting portion is one end of a tubular housing or conduit 86. This housing encloses the thermostat and has a reverse or rearward turn with a portion thereof extending along the top of the machine for enclosing wires 88 from the heating element 82 and conduit 90 from the thermostat 84 and other control equipment as necessary. The upper rearwardly extending portion of the housing 86 is supported on a pair of upright brackets 92 integral with the freezing barrel. Housing 86 has a depending arm 94 which is adapted for engagement by the setscrew 56 in the bracket 52 so that the setscrew serves not only to clamp the front wall on the machine but also to clamp the housing 86 for the temperature control means in place.

Front wall 14 is preferably constructed of a heat insulating material, such as rubber or well known plastic materials, in order that there will be minimum of influence of the front wall on the sensing head 66. Furthermore, the sleeve 78 is made of heat insulating material in order that the housing 86 is isolated from the sensing head 66.

With regard to the operation of the present machine, reference is first made to FIG. 5. This figure comprises a wiring diagram which is greatly simplified and included only for the purpose of illustrating such operation. It is to be understood that other control features may be included in the wiring diagram but since such features are common in the art and are not critical to the present invention, they are not shown. A pair of feed wires 96 supply current to the refrigerating system 22 and to the motor mechanism 28 which drives the mixing arm 24. Incorporated in one of these feed lines is a pressure sensitive switch 98 operated by the thermostat 84. The wires 88 for the heating element 82 are connected into respective feed wires 96, and one of the wires 88 includes a normally closed switch 100 therein having a switch arm 102 held in the open position of the switch by a projection 104 on the valve 60 when the latter closed. The arrangement is such that when the valve is closed it opens the switch 100 but when the valve 60 is opened to draw ice cream from the freezing barrel the switch 100 closes to energize the heating element 82.

Thus, according to the arrangement shown, when the operator draws off ice cream, the heating element 82 is energized and the thermostat being heated, closes the pressure sensitive switch 98 to start the refrigerating system and the drive motor mechanism 28 for the mixing arm 24. When the operator closes the valve 60, the switch 100 is opened to cut off currrent flow to the heating element 82. In view of the residual heat in the head 66 the switch 98 will remain closed to maintain the refrigerating system and the drive motor mechanism 28 in operation for a short while. The refrigerating system 22 and drive motor mechanism 28 will remain in operation as long as the residual heat in the head 66 is sufficient to keep switch 98 closed. Upon drawing off ice cream through the valve 60, mix will be introduced from the reservoir 36 and this mix, being warmer than the ice cream, will also influence operation of the refrigerating system 22 and the drive motor mechanism 28 under the control of the thermostat 84 and switch 98.

With the machine standing idle, the head 66 will sense any warming function in the freezing barrel and immediately turn on the refrigerating system and the mixing motor mechanism to maintain the freezing temperature range which produces a smooth serving consistency.

The present ice cream machine by its construction and operation thus makes a better ice cream due to its accurate sensing of the temperature by the head 66 and by the uniform rate of introduction of the ice cream mix from the reservoir 36 into the freezing chamber. That is, the head 66 having a sensing surface 74 directly exposed to the ice cream provides for maximum sensing so that the temperature can always be kept within the limits desired. Also, the inlet stem 42 and its inlet port 46, being adjustable vertically by the float 44 as the mix M varies in height in the reservoir, provides an identical head pressure in all intake operations and thus the rate of inflow of the mix is not altered by the head pressure. The valve 47 is used to control the rate of flow through the opening. Since valve 47 is hollow and open ended, air is admitted with the mix to provide the desired amount of overrun.

According to the present invention, the accurate sensing and maintaining of the temperature in the freezing barrel and the accurate rate of inflow of the mix, as well as introduction of the air into the mix, produces an ice cream of improved quality in that the serving consistency is maintained, the crystalline grain growth normally caused by fluctuating temperatures is at a minimum, and the desired overrun is maintained.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. An ice cream machine for making and dispensing soft ice cream comprising.
   a. a freezing barrel having an outlet valve,
   b. means in said freezing barrel for mixing ice cream at a selected capacity,
   c. refrigerating means associated with said freezing barrel for cooling said barrel at a selected capacity,
   d. a reservoir for ice cream mix,
   e. upright tubular means establishing communication between said reservoir and a lower portion of said freezing barrel,
   f. float means in said reservoir having buoyant support on the mix in said reservoir to follow the level of mix in the latter,
   g. a hollow open-ended depending stem integral with said float projecting down through said reservoir and therebelow into sliding engagement in said upright tubular means,
   h. and means defining an opening in said stem for admitting ice cream mix to the stem for gravity flow into said tubular means and said freezing chamber as ice cream is drawn off through said outlet valve,
   i. said opening being disposed in said stem below the level of mix in the reservoir and maintained at a constant height relative to the surface of the mix whereby a constant head pressure is maintained in said tubular means to said freezing barrel,
   j. said opening being of a selected size such that the rate of flow therethrough is approximately equal to or slightly greater than the freezing and mixing capacity of said freezing barrel,
   k. the open upper end of said stem being open to atmosphere to admit air into said mix.
   l. an adjustable valve means which includes an open ended hollow tube mounted within said stem maintaining the upper end of said stem open to the atmosphere.

2. The machine of claim 1 wherein, said valve being rotatable in said stem and having a side notched portion arranged to be aligned with said opening through which the mix arranged to flow, said valve being adjustable vertically to control the amount of said unnotched portion aligned with said opening.

3. The machine of claim 1, said valve being rotatable in said stem and having a side notched portion arranged to be aligned with said opening through which the mix is arranged to flow, said valve being adjustable vertically to control the amount of said unnotched portion aligned with said opening, said valve being rotatable to a position wherein the unnotched portion thereof is in front of said opening to completely close off the opening.

* * * * *